United States Patent
Svensson

(10) Patent No.: US 6,530,578 B1
(45) Date of Patent: Mar. 11, 2003

(54) GRIPPING ARRANGEMENT

(76) Inventor: Bo Karl Ragnar Svensson, Nybrogatan 75, S-114 40 Stockholm (SE)

( * ) Notice: Subject to any disclaimer, the term of this patent is extended or adjusted under 35 U.S.C. 154(b) by 0 days.

(21) Appl. No.: 09/647,337

(22) PCT Filed: Mar. 29, 1999

(86) PCT No.: PCT/SE99/00507

§ 371 (c)(1),
(2), (4) Date: Sep. 29, 2000

(87) PCT Pub. No.: WO99/50011

PCT Pub. Date: Oct. 7, 1999

(30) Foreign Application Priority Data

Mar. 30, 1998 (SE) ............................................... 9801100

(51) Int. Cl.[7] .......................... B23B 31/30; B23B 31/18
(52) U.S. Cl. .................. 279/4.12; 279/106; 294/86.29; 294/88; 294/106
(58) Field of Search ............................. 279/4.12, 35–37, 279/106–109; 294/86.29, 88, 97, 106, 115; 414/753.1; 901/31, 37, 39

(56) References Cited

U.S. PATENT DOCUMENTS

| 393,093 A | * | 11/1888 | Bignall ........................ 279/108 |
| 1,194,817 A | * | 8/1916 | Carpenter .................... 279/108 |
| 2,381,657 A | | 7/1945 | Eksergian et al. |
| 3,981,673 A | | 9/1976 | Sokolow |
| 4,529,432 A | * | 7/1985 | Nebelung et al. ........... 294/115 |
| 4,667,998 A | | 5/1987 | Borcea et al. |
| 4,744,596 A | * | 5/1988 | Hiller et al. ................. 294/115 |
| 4,892,344 A | * | 1/1990 | Takada et al. ................ 901/37 |
| 5,299,847 A | | 4/1994 | Blatt et al. |
| 5,836,633 A | * | 11/1998 | Svensson .................... 294/115 |
| 5,904,358 A | * | 5/1999 | Hosono et al. ............. 279/4.12 |

FOREIGN PATENT DOCUMENTS

| GB | 966644 | 8/1964 |
| SE | 506834 | 7/1993 |

* cited by examiner

Primary Examiner—Steven C. Bishop
(74) Attorney, Agent, or Firm—Banner & Witcoff, Ltd.

(57) ABSTRACT

The present invention relates to an arrangement (1) for gripping and holding or releasing a material (M), such as material held in a lathe chuck. The arrangement includes a piston-cylinder assembly (2) and a plurality of material gripping and holding or releasing elements, so-called gripping element arrangements (3). The gripping elements are movable between two positions, an open position and a closed position, in response to movements of the piston-cylinder assembly (2). The cylinder-part (22) of the piston-cylinder assembly (2) includes a circular groove (22a) for co-action with rolling support surfaces (12c) associated with said gripping element arrangement (3). The arrangement also includes a separate gripping member (50) which can be readily fitted to the free end-part (3a) of the gripping element (3') and readily removed therefrom.

46 Claims, 7 Drawing Sheets

GRIPPING ARRANGEMENT

FIELD OF INVENTION

The present invention relates to an arrangement for gripping and holding or releasing material, such as material held and worked in a lathe chuck, this arrangement being referred to hereinafter as a gripping arrangement.

The invention is based on a gripping arrangement that includes a piston-cylinder assembly and a number of material gripping and holding or releasing elements, so-called gripping elements and illustrated in the form of so-called gripping claws. A gripping arrangement equipped with such gripping elements can be activated by axially-related movement of said piston-cylinder assembly so as to rotate the gripping elements around a body-related axis between two positions, a first and a second position, in which the gripping-elements and gripping-claws are open and closed respectively.

Piston-cylinder assemblies of this kind include a piston-part and a cylinder-part which are adapted to move axially and reciprocatingly relative to one another through the action of a pressurized medium and a spring arrangement or spring unit.

By "piston part" is meant a piston-related arrangement where an outer peripheral surface, normally a cylindrical surface of circular cross-section, is machined to carry or present sealing means, such as packings, piston rings or the like against an inner surface of the cylinder part.

By "cylinder part" is meant a cylinder-related arrangement where an inner surface, normally a cylindrical surface of circular cross-section, that has been made smooth at least within a given area, so as to be able to co-act with the sealing means on said piston part.

Alternatively, the cylinder part may be fitted with sealing means and the piston-part made smooth, in accordance with the inventive concept.

In the case of known piston-cylinder assemblies, the cylinder-part is normally fixed in relation to a stand or frame and the piston-part is moved reciprocatingly in relation to the cylinder-part by a working medium that is pressurised in a pressure generating device.

DESCRIPTION OF THE BACKGROUND ART

Several different designs of gripping arrangements of the aforedescribed nature are known to the art.

The gripping arrangement illustrated and described in GB Patent Publication 966 644 is a particular example in this regard.

The construction taught by Patent Publication U.S. Pat. No. 2,381,657 is also relevant in this regard.

Swedish Patent Application 9200096-7 teaches a material gripping and holding or releasing arrangement which includes a piston-cylinder assembly having a number of material gripping and holding or releasing elements, so-called gripping claws.

These gripping claws are caused to pivot about a fixed shaft between two positions, an open position and a closed position, in response to axial movement of the piston-cylinder means.

In the case of these earlier known arrangements taught by the aforesaid prior publications where the gripping claws are actuated by a piston-cylinder means, the claws are moved in response to axial movement of the piston in a cylinder that is fixed in relation to a machine body.

The present invention can be considered to constitute a further development of the gripping arrangement described and illustrated in International Patent Application PCT/SE 95/01193 (having International Publication No. WO 96/12582) and reference is made to this publication for a closer understanding of the basic principles of the present invention.

SUMMARY OF THE INVENTION

Technical Problems

When taking into consideration the technical deliberations that a person skilled in this particular art must make in order to provide a solution to one or more technical problems that he/she encounters, it will be seen that on the one hand it is necessary initially to realise the measures and/or the sequence of measures that must be undertaken to this end, and on the other hand to realise which means is/are required in solving one or more of said problems. On this basis, it will be evident that the technical problems listed below are highly relevant to the development of the present invention.

When considering the present state of the art; as described above, it will be seen that a technical problem resides in providing a gripping arrangement of the aforedescribed kind that is comprised entirely of only a few individual parts, and which can be readily assembled and readily dismantled and where its component parts can be readily exchanged when becoming worn and/or when changing a gripping arrangement of one shape and size for a gripping arrangement of another shape and size.

With respect to the use of a gripping arrangement that comprises only a few individual parts, a technical problem resides in realising the significance of and the advantages afforded by using as a first part a fixed piston-part, by using as a second part a reciprocatingly movable cylinder part, by using as a third part a central body-related shaft-part, by using as a fourth part a spring unit, and by using a number of fifth parts, such as three parts, in the form of gripping elements.

Another technical problem is one of realising the significance of and the advantages associated with a gripping arrangement of the aloredescribed kind which includes a simple piston-cylinder construction in which the cylinder-part is reciprocatingly movable in relation to its longitudinal axis, said reciprocating movement also being relative to a shaft-like body-related part and also relative to said piston-part, said shaft-like part and said piston-like part both being fixed in relation to a body part.

Another technical problem is one of realising the significance of providing the cylinder-part of said piston-cylinder means with a circumferentially extending groove adapted for co-action with the gripping-element arrangement and functioning particularly as a support for the rear support surfaces of the gripping elements or gripping claws, such as the rolling surfaces thereof.

Another technical problem is one of realising the significance of and the advantages afforded by using a specially formed, body-related and shaft-like central part that will slide through the cylinder-part and which is adapted to co-act with the piston-part and firmly hold said piston-part.

It will also be seen that a technical problem is one of realising the significance of and the advantages afforded by providing the body-related part within one end-part thereof, its front part, with a number of radially extending slots or grooves adapted to respective gripping-element arrangements, and with a hole and a shaft or pin extending transversely from the centre shaft, such as to pivotally hold respective gripping-element arrangements through the medium of a hole in the gripping element.

Another technical problem is one of creating conditions with the aid of constructive means such that when the gripping arrangement is assembled, each of said transverse holes and a shaft or pin accommodated therein, and requisite stop means, such as stop screws, can be accommodated in the cylinder part.

In order to facilitate removal of the gripping-element arrangement and the replacement of one arrangement with another, it will be seen that a technical problem remains in enabling the transverse hole and a shaft located therein to take a position in which they are completely free or preferably only partially free in a position immediately adjacent said cylinder part.

It will also be seen that a technical problem resides in providing a gripping arrangement in which the retracted position of the gripping-element arrangements and an adapted immediately external position can be achieved solely by rotating the cylinder-part around the piston-part through a predetermined number of turns, such as three to four turns.

Another technical problem is one of realising the conditions required with respect to dimensioning of the depth of a groove in the cylinder-part so as to enable parts of the gripping-element arrangements to be brought to an exposed position immediately outside the cylinder-part.

Another technical problem is one of realising the significance of and the advantages afforded by allowing a part of a fixed body to function as the piston-part.

Yet another technical problem is one of realising the significance of and the advantages afforded by allowing the cylinder-part to move reciprocatingly in its axial direction relative to said body (a body-associated central part and the piston-part) through the medium of a movement activatable device.

Another technical problem is one of enabling the gripping edges of the readily assembled and readily dismantled gripping-element arrangement to take a first position (an open position) when the piston-part is fully retracted relative to the cylinder-part, and to take a second position (a closed position) when the piston-part has been fully extended relative to the cylinder-part by means of a pressurised medium, such as coolant, and to enable the rear parts of the gripping-element arrangement to turn in an arcuate path around their attachment point, said arcuate path being symmetrical with or at least generally symmetrical with a vertical plane through the pivotal attachment point.

In the case of this application of the invention, a technical problem resides in realising the significance of and the advantages afforded by providing respective gripping elements with a first and a second end-part where one end-part has the form of a gripping claw that includes a material gripping surface or gripping edge, and the other of said end-parts is firmly connected to and readily releasable from said central part through the medium of a pivot shaft.

Another technical problem is one of realizing the significance of causing said body-associated or body-related central part to extend through the cylinder-part and through the piston-part, and of providing the forward portion of the central-part with an adapted number of elements for rotatable co-action with one end of respective gripping-element arrangements, and by providing, at the rear portion of said gripping elements, roller bearing for facilitating rotary movement of the gripping elements along radially extending support surfaces formed transversely of a circular groove provided in the cylinder-part, in response to axial movement of the cylinder-part in relation to the piston-part.

Another technical problem is one of realising the significance of allowing the body-related central part to be comprised of a cylinder-shaped part whose front end-part includes said elements and radial grooves in a collar for accommodating said gripping-element arrangement and for co-action with one end of respective gripping elements and the rear, tapering part of which is firmly connected to the body and adapted to hold the piston-part through the medium of an axially-related clamping action.

Another technical problem is one of realising the significance of and the advantages associated with adapting the rear region of a gripping element for radial co-action with and along a support surface belonging to the groove in the cylinder-part, within a region located between 25 and 75% of the distance between a centre line of the central-part and the peripheral cylindrical surface of said cylinder-part.

Another technical problem is one of realising the significance of providing such a gripping arrangement with a spring unit within and along the centre region of said central-part and enabling the spring unit, when fitted, to exert a pressure between a front collar or shoulder on the central-part and an inner edge of the cylinder-part.

Another technical problem is one of being able to realise the significance of providing the reciprocatingly movable cylinder-part with a peripheral collar or hollow-cylindrical part whose inner surface sealingly embraces the outer surface of the piston-part fixed relative to said body.

Another technical problem is one of realising the significance of and the advantages afforded by allowing each of a chosen number of radial grooves in said collar to open-out, via grooves in the cylinder-part, into said circular grooves in the outer cylindrical surface of the cylinder-part.

Another technical problem is one of realising the significance of providing in the rear portion of respective gripping elements a hole through which a shaft or pin extends and providing on said shaft and on each side of the gripping element roller bearings for rolling co-action with parts of the radially extending support surface of said circular groove.

Another technical problem resides in providing the outer part of the gripping element with a readily fitted and readily removed gripping member that can be easily produced from a mechanical/technical aspect.

Another technical problem is one of realizing the significance of giving the outer part of the gripping element a part-circular surface with which a part-circular on the gripping member can be connected.

Another technical is one of realizing the significance of giving the part-circular surface on the gripping element a purely circular shape that has an angle of arc greater than 90°, for instance between 120° and 170°, while giving the gripping member a purely circular shape that has an angle of arc of between 90° and 170°.

It will also be seen that a technical problem is one of realising the significance of providing a gripping-member locking device, such as a screw, adapted to the gripping element on a radial line passing through a part that is contained by the aforesaid angle of arc of the circular surface of the gripping member.

Another technical problem is one of realising the significance of positioning the locking device at an adapted distance from the gripping edge of the gripping member, for simple adaptation and attachment of the gripping member to said gripping element.

It will also be seen that a technical problem is one of providing a gripping element with a gripping surface, such as a slightly rounded surface, adapted for co-action with soft material, or of providing a gripping member with a knife-like gripping edge for gripping co-action with a harder material where said knife-like gripping edge can be readily replaced when worn down or when replacing the gripping-element arrangements with other gripping-element arrangements that are suitable for use in another material working operation.

Another technical problem is one of providing a gripping arrangement with which the gripping-element arrangement can be readily removed and/or replaced by adapted axial displacement of each of the pivot shafts within the body-related central part against means for stopping said axial movement.

Solution

With the intention of solving one or more of the aforesaid technical problems, the present invention takes as its starting point a gripping arrangement for gripping, holding or releasing material, such as material held and worked in a lathe chuck, wherein said gripping arrangement includes a piston-cylinder assembly and a plurality of material-gripping and material holding or releasing elements, a so-called gripping element arrangement, and wherein said gripping elements can be moved in an arcuate path between two positions, an open position and a closed position in response to axial movements generated by the piston-cylinder assembly.

In accordance with the invention, it is proposed that the cylinder-part of the piston-cylinder assembly shall be provided with a circumferentially extending groove which is able to function as a support for and co-act with support surfaces belonging to said gripping element arrangement.

According to proposed embodiments that lie within the scope of the inventive concept, it is proposed that a body-related central part shall extend through the cylinder-part and be adapted for fixed co-action with the piston-part.

One end-portion of the body-related central part will conveniently include radially extending slots or grooves adapted to respective gripping elements of said gripping element arrangement, with a hole and a pin or shaft received therein for pivotally securing said gripping-element arrangement.

It is also proposed that the piston-part also functions as a further body-related part.

Thus, the cylinder-part shall be reciprocatingly movable axially in relation to the piston-part in response to movement activatable means.

In a position in which the cylinder-part is forwardly moved in relation to the piston part, the gripping edges of the gripping elements of said gripping element arrangement are located in a first position (an open position), whereas said gripping edges of said gripping elements are located in a second position (a closed position) when the gripping elements are fully retracted.

The gripping elements of said gripping element arrangement shall each have a first and a second end-part, where the first end-part is in the shape of a claw having a material gripping surface or gripping edge, and the second end-part is firmly connected to said central-part through the medium of a pivot shaft, such as to be easily fitted and easily removed from said central part.

According to one embodiment of the invention, the body-related central part shall extend through the cylinder-part and through the piston-part, and the forward portion of said central part shall include means for pivotal co-action with one end of respective gripping elements, wherein roller bearings are provided in the rear region of the gripping element to facilitate movement along radially extending surface parts of the periphery-related groove orientated in the cylinder-part, during rotary movement of said gripping element in response to axial movement of said cylinder-part.

It is also proposed that the body-related central part is comprised of a cylindrical part whose front end-portion includes radial grooves in a collar for receiving said gripping element arrangement and for co-action with one end of respective gripping elements, and the rear-tapering part of which gripping element is firmly connected to the body and to the piston-part.

The invention also proposes that the rear region of the gripping element is adapted for co-action with a groove in the cylinder-part within a radial area that corresponds to between 25 and 75% of the radial distance between a centre line of the central-part and the outer peripheral surface of the cylinder-part.

A spring unit is arranged midway of the central-part and exerts a given pressure between a front collar on the central-part and the cylinder-part.

According to the invention, the cylinder-part will conveniently include an integrated, outer peripheral collar or a cylindrical hollow body which is adapted to surround the piston-part, which is fixed relative to the aforesaid body.

According to one embodiment of the invention, each of the radial grooves in the collar shall open out into the circular grooves in the outer cylindrical surface of the cylinder-part through corresponding radial grooves in said cylinder-part.

The rear end of respective gripping element arrangements include a shaft-accomodating hole. Mounted on the shaft and on each side of the gripping element are ball bearings which co-act with the radially facing support surfaces or parallel radially facing outer parts of the circular groove so as to roll along said surfaces or said parts.

According to another embodiment of the invention, the aforesaid body includes three slots which are spaced equidistantly at angles of 120°.

According to another embodiment of the invention, the gripping element arrangement is adapted to co-act with a separate gripping member which can be readily fitted to the outer part of respective gripping element and readily removed therefrom.

The gripping member can be easily manufactured from a technical aspect, preferably in a press or a lathe.

The outer part of the gripping element has an inwardly facing, part-circular or arcuate surface which can be coupled to an outwardly facing, part-circular or arcuate surface on the gripping member.

The circular surface on the gripping element may conveniently have a true part-circular shape with an angle of arc greater than 90°, preferably between 120° and 170°.

The circular surface on the gripping member may also conveniently have a true part-circular shape, with an angle of arc of between 90° and 170°.

For the purpose of enabling the gripping member to be secured to and released from said gripping element, the arrangement includes a locking device disposed on a radial line belonging to said circular shape and passing at least through the angle of arc of the circular surface on the gripping member.

The locking device is spaced at an adapted distance from a gripping edge of the gripping member.

The claw-like gripping edge of the actual gripping element is configured and adapted (rounded) to grip soft material, such as plastic and similar soft material, whose surface shall not be damaged.

A gripping edge on the separate gripping member is adapted (pointed) so as to be able to grip against harder material, such as steel and other metals.

Advantages

Those advantages primarily associated with an inventive gripping arrangement reside in the provision of conditions which enable a complete gripping arrangement to be assembled from only a few parts, of which the gripping element arrangement can be readily replaced or exchanged.

The use of an axially reciprocatingly movable cylinder-part of a piston-cylinder assembly enables the gripping element arrangement to be easily withdrawn into the cylinder-part during operation, and projected out slightly when changing a gripping element arrangement.

The invention also enables a gripping member to be readily fastened to an outer part of the gripping element, said gripping member being a separate component and having a gripping edge and capable of being easily replaced with another gripping member in the event of excessive wear or in the event of an alteration in material-working conditions.

BRIEF DESCRIPTION OF THE DRAWINGS

The invention will now be described in more detail with reference to exemplifying embodiments thereof and also with reference to the accompanying drawings, in which.

DETAILED DESCRIPTION OF PREFERRED EMBODIMENTS

Figure 1:
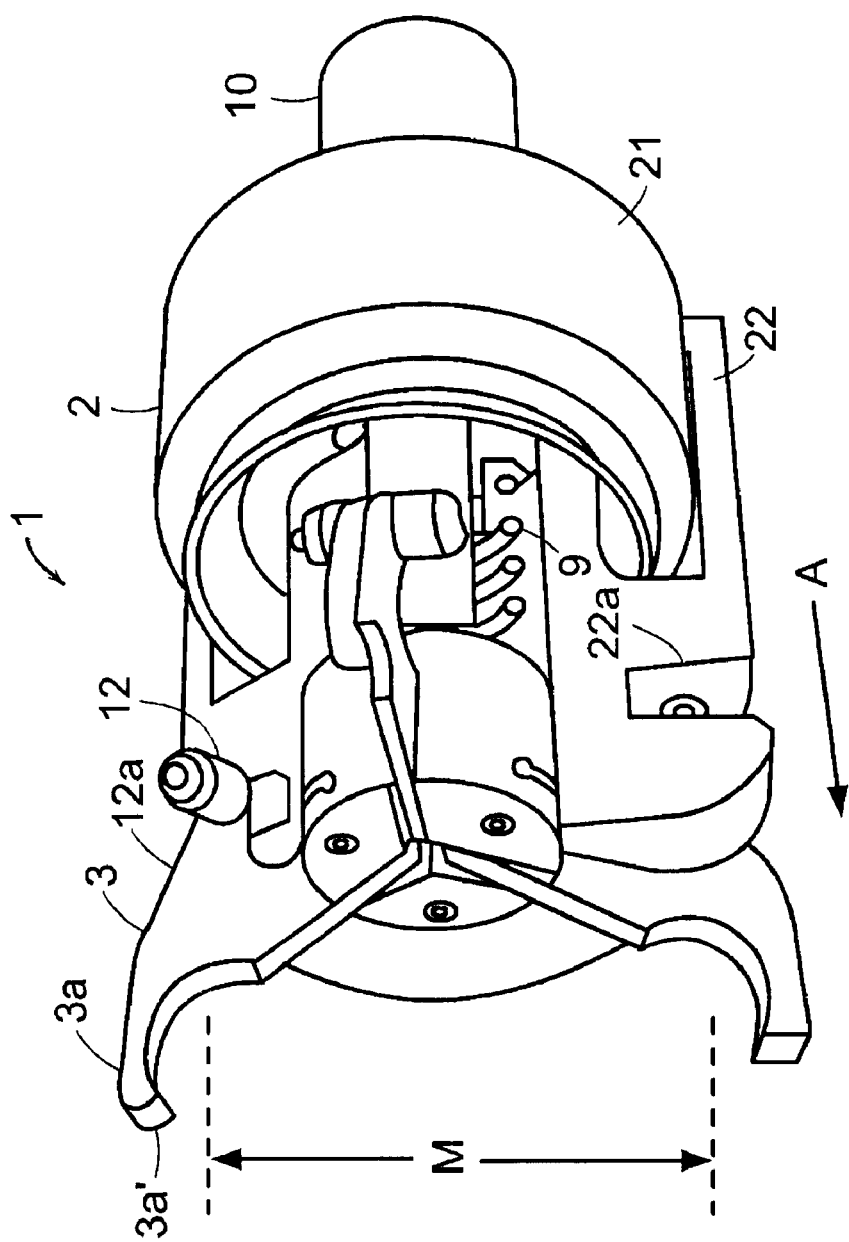
FIG. 1 is a perspective, partially cut-away view of a gripping arrangement that includes gripping elements, and shows said elements in a fully open position.

The drawings illustrate a gripping arrangement 1 constructed for gripping and securing or releasing a piece of material (M) (not shown in detail), such as a workpiece held in a lathe chuck. The gripping arrangement 1 includes a piston-cylinder assembly 2 and a plurality of gripping, holding and releasing elements, referred to hereinafter as gripping element arrangements.

The illustrated embodiment includes three such gripping element arrangements, which are spaced equidistantly at an angle of 120°. Because the gripping element arrangements are mutually identical, only one such arrangement, i.e. the arrangement referenced 3, will be described.

Such a gripping element arrangement 3 includes a gripping element which has the form of a claw 3' and which includes an outer part 3a, an inner or lower part 3b, and a rear part 3c, the nature of which will be described hereinafter.

Figure 2:
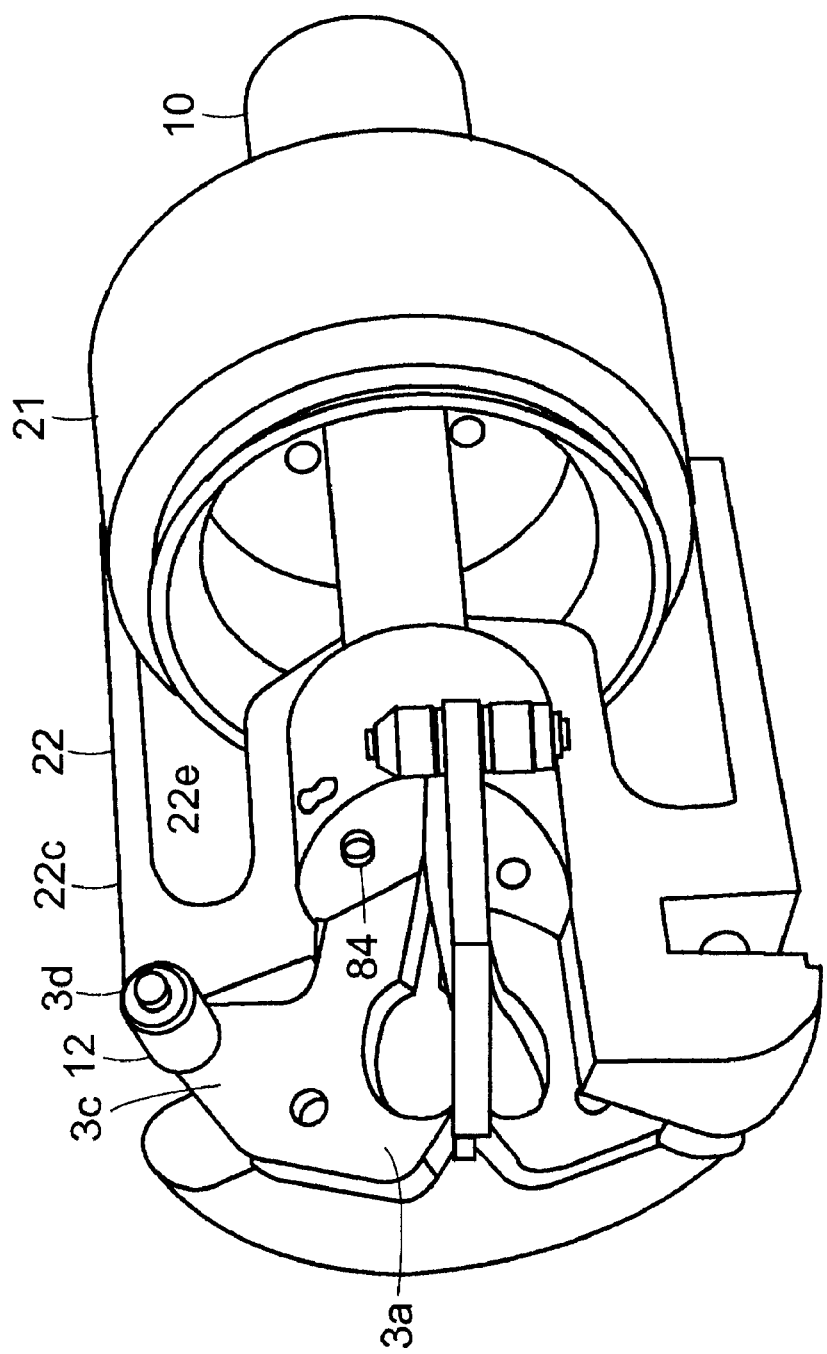
FIG. 2 is a perspective, partially cut-away view of the gripping arrangement of FIG. 1, with the gripping elements in a fully closed position.

The gripping elements of said arrangement 3 can be moved between the fully open position shown in FIG. 1 and the fully closed position shown in FIG. 2, in response to corresponding axial movement of the piston-cylinder assembly 2, via their rotation about a shaft 4. The gripping elements can also be moved to positions intermediate of these two extreme positions.

The piston-cylinder assembly 2 is comprised of a piston-part 21 and a cylinder-part 22 which can be moved axially away from each other with the aid of means provided to this end, e.g. in the from of air supply means in the case of a pneumatic drive, or coolant or water in the case of a hydraulic drive, said drive medium being passed through a pipe 5 to a space 6 located between the piston-part and the cylinder-part.

The space 6 also co-acts with a ventilation valve or bleed valve 7.

The valve 7 includes a hexagonal hole for receiving a hexagonal spanner or "Allen" key.

The gripping arrangement 1 also includes a central part 8 which is firmly connected to a body 10 by means of a threaded part 8a.

The central part 8 is adapted for clamping the piston-part 21 against said body 10, wherewith the piston-part 21 will also be fixed relative to said body 10 or to a body-related part 10'.

When the space 6 is pressurised, the cylinder-part 22 will move in the direction of the arrow "A" against a spring force exerted by a spring unit 9, and therewith rotate the gripping part or outer part 3a of respective gripping element arrangements around their shafts or pins 4 and towards the centre axis 8' of the central part 8.

The cylinder-part 22 of the piston-cylinder assembly includes a circular peripheral groove or channel 22a which is positioned at a small distance "b" from the front surface 22b of said cylinder-part 22, said groove or channel 22a opening into the outer cylindrical surface 22c of the cylinder-part.

The peripheral opening of the groove 22a is covered by a circular member, such as a ring 11.

The width and the depth of the groove 22a are adapted so that surface sections 22a' of said groove can co-act supportively with support surfaces 12c of respective gripping element arrangements 3. The nature of said supportive surface 12c will be described in more detail hereinafter.

The body-related central-part 8 extends through the cylinder-part 22 and is fixed to the piston-part 21 through the medium of an edge 8b, for coaction therewith.

The body-related central part 8 has at one end 8c thereof slots or grooves 8d which extend radially from the centre line 8' at mutual angles of 120° and are adapted to receive respective gripping element arrangements 3 and their associated gripping elements 3'.

The body-related part 8 is provided at said end-part 8c with a collar 8h and a hole 8e for receiving a shaft or pin 4, such as to rotatably secure the claw-shaped gripping element 3'.

The arrangement of said collar 8h, slots 8d and shafts or pins, e.g. the shaft 4, will be described in more detail hereinafter with reference to FIG. 8.

The piston-part 21 thus functions as a further body-related part and contributes towards stable attachment to the body 10.

The cylinder-part 22 is reciprocatingly movable in an axial direction in response to movement activating means 5. Movement of said cylinder-part in one direction is in response to pressurisation of the space 6 and further compresses the already slightly compressed spring unit 9. Movement of the cylinder-part 22 in the other direction, back to its starting position, is achieved by removing the pressure in the space 6 and through the medium of the spring force exerted by the spring unit 9.

Figure 3:
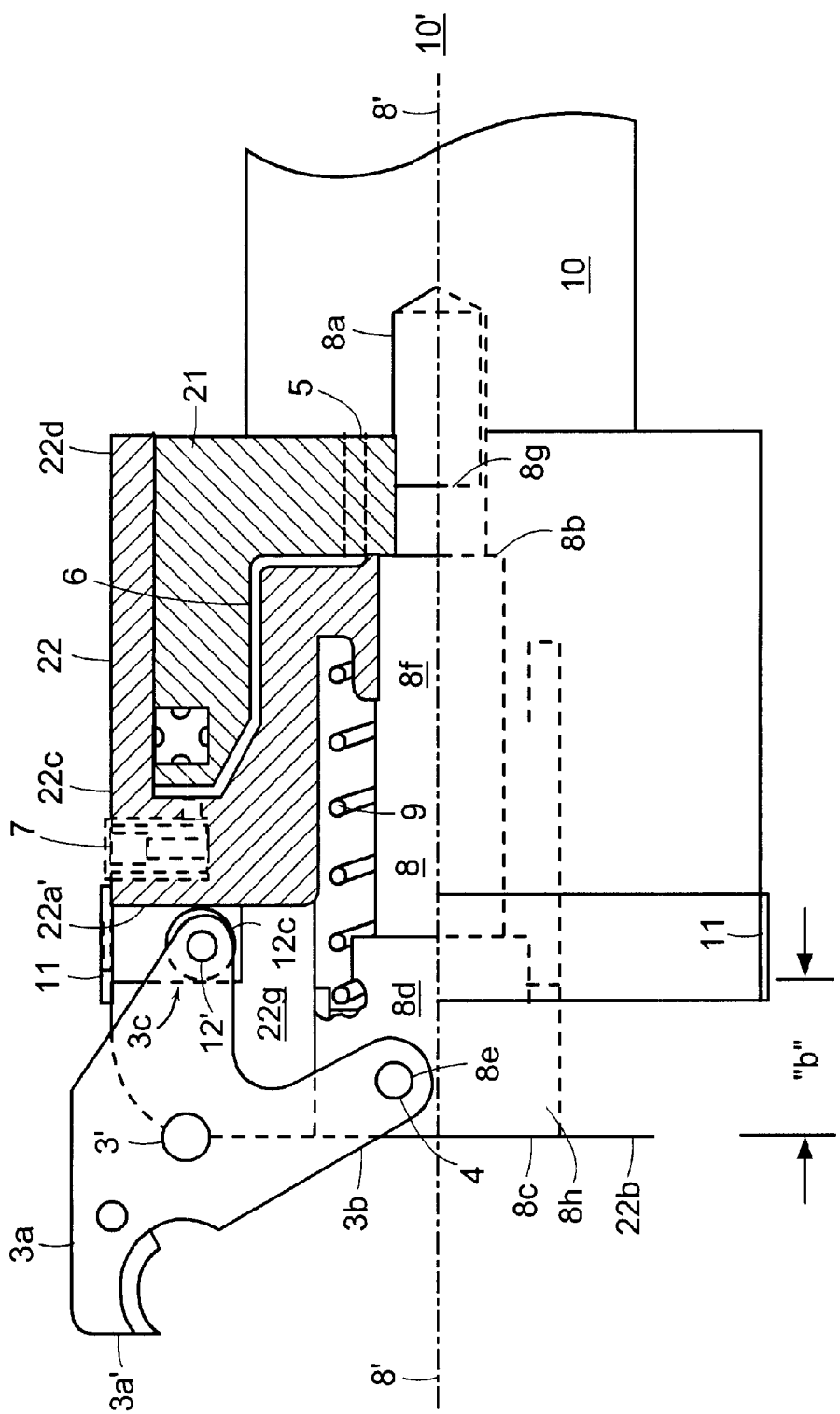
FIG. 3 is a sectioned side view of the gripping arrangement shown in FIG. 1 and illustrates chosen structural details, particularly the details relating to the piston-cylinder assembly.

When the cylinder-part 22 is in a fully extended state relative to the piston-part 21 and the body 10, the gripping elements of respective gripping element arrangements 3 will be fully closed, as shown in FIG. 2, whereas when said cylinder-part is fully retracted, as shown in FIGS. 1 and 3 among others, the gripping elements of said arrangements (3) will have another position, an open position.

Respective gripping elements, in the form of gripping claws 3', have a first end-part 3a and a second end-part 3b, where an outermost first end-part 3a is formed as a gripping surface 3a' or a gripping edge for material "M" and the inner or second end-part 3b is firmly connected to, but readily removable from, said central body-related part 8, while an adjacent portion 8g of said part 8 extends through the piston-part.

The body-related part 8 has a central portion 8f which extends through the cylinder-part 22 and an adjacent portion 8g which extends through the piston-part.

The front portion 8c of the central-part 8 has requisite means for rotatable co-action with one end of respective gripping element arrangements 3. Mounted at the rear 3c of a gripping element 3' are roller bearings 12, 12a whose surfaces 12c run or roll along radially extending, parallel sections 22a' of the groove 22a in the cylinder-part 22, as the gripping element 3 moves arcuately around its pivot shaft 4 in response to movement of the cylinder-part 22 in the direction of arrow "A".

The body-related central part 8 is comprised of a cylindrical shaft or part. The front end-portion 8c of said central part includes the radial grooves 8d in the collar 8h which are co-ordinated with the grooves 22g in the cylinder-part 22 for accommodating said gripping element arrangements 3 and co-acting with one end of respective gripping elements 3', and whose rear tapering part, including the edge 8b and the part 8g, is firmly connected with the piston-part 21 and the body 10.

The rear portion 3c of the gripping element 3' is adapted to act against the groove 22a in the cylinder-part within a radial area located between 25 and 75% of the distance "a" between a centre line 8' of the central-part 8 and the outer peripheral surface 22c of the cylinder-part 23.

The spring unit 9 is mounted in the middle 8f of the central- part 8 and acts between a front collar-edge 8h' of the central-part 8 and an edge 22' on the cylinder-part 22.

The cylinder-part 22 has an outer, peripheral, rearwardly extending collar 22d in the form of a hollow-cylindrical element having an inner circular surface 22e with which a seal 21a for the piston-part 12 abuts.

The outer peripheral collar 22d is adapted to surround the piston-part 21, which is fixed relative to the body 10.

Each of the radial grooves 8d in the collar 8h opens into the circular groove 22a in the outer cylindrical surface 22c of the cylinder-part, via grooves 22g in said cylinder-part, wherein a distance "c" between the pivot shaft or pin 4 and the surface 22a' of the groove 22a along the centre line 8' is adapted to correspond to half the movement path of the cylinder-part 22 relative to the piston-part 21.

The rear parts 3c of respective gripping elements 3 include a hole 3c' which accommodates a shaft which carries said roller bearings 12, 12a on two sections 12' thereof and on each side of the gripping element 3', the rolling surfaces 12c of said bearings being adapted for rolling co-action with a respective radially extending support surface 22a' of the circular groove 22a.

Figure 6:
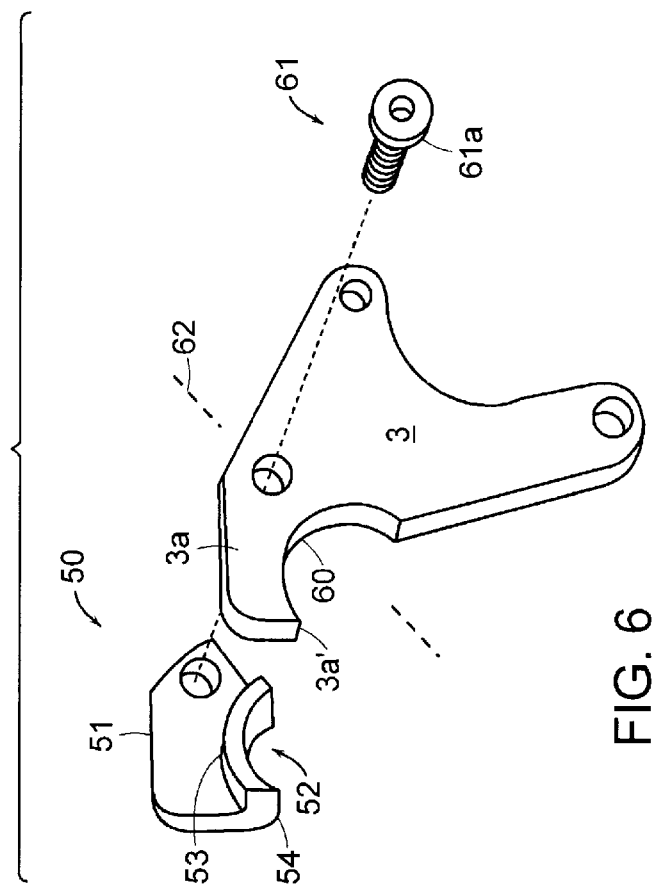
FIG. 6 is an exploded view of the embodiment shown in FIG. 5.
Figure 5:
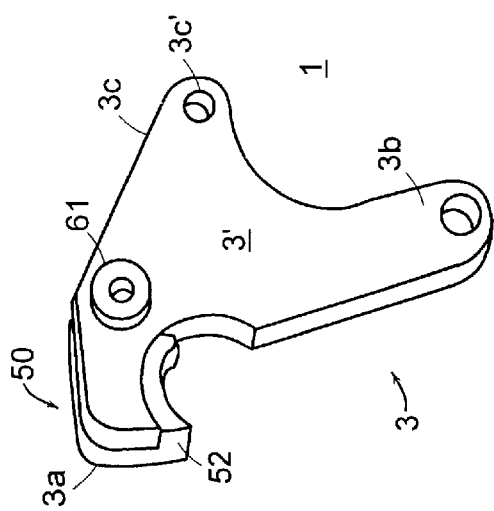
FIG. 5 is a perspective view of a gripping element in the form of a gripping claw, and shows a separate gripping member having a gripping edge fastened to the free end of said gripping element by means of a locking device.

FIGS. 5 and 6 illustrate part of a gripping element arrangement 3 to which a gripping member 50 is fastened.

The outer part 3a of the claw-shaped gripping elements of said gripping element arrangement 3 co-acts with the gripping member 50, which can be readily fitted to and removed from said gripping element.

The gripping member 50 is comprised of a plate 51 which includes an edge surface 52 and which can be readily produced from a mechanical/technical aspect.

The gripping member 50 includes an arcuate or part-circular surface 53 which can be coupled to an arcuate or part-circular surface 60 on the outer part 3a of the gripping claw 3'. The surfaces 60 and 53 may have a shape that deviates from a circular shape, such as an elliptical shape, so as to enable said surfaces to be locked in one single relative position.

The arcuate surface 60 of the illustrated gripping claw 3' has a purely mathematical circle shape or a circle-segmental shape, with an angle of arc greater than 90°, such as between 120° and 170°, particularly about 150°.

The arcuate surface 53 on the gripping member 50 has a pure part-circular shape or circle-segmental shape, with an angle of arc of between 90° and 170° and the same radius as the surface 60. The angle of arc in the illustrated case is about 100°.

A locking device 61 in the form of a screw 61a for fastening the gripping element 50 to the gripping claw 3' and releasing said gripping member therefrom is provided on a radial line 62 that passes through the arcuate section 53 of the gripping member 50.

The locking device 61 is positioned at an adapted distance from a gripping edge 54 on the gripping member 50.

The gripping claw 3' includes a gripping edge 3a', suitably a rounded edge, which is intended for gripping soft material, such as plastic and like material.

Figure 4:
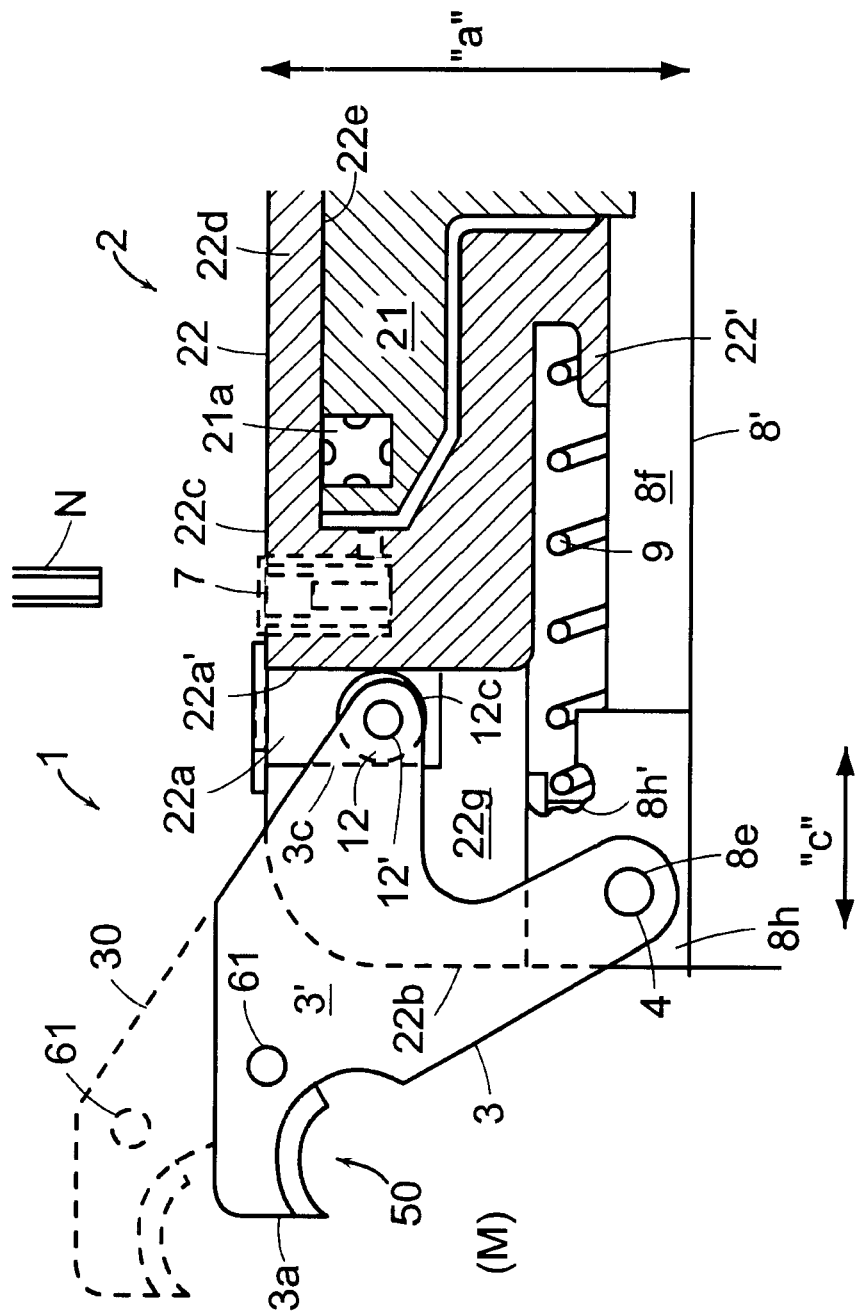
FIG. 4 is a slightly larger view of details, or features, of the embodiment shown in FIG. 3.
Figure 7:
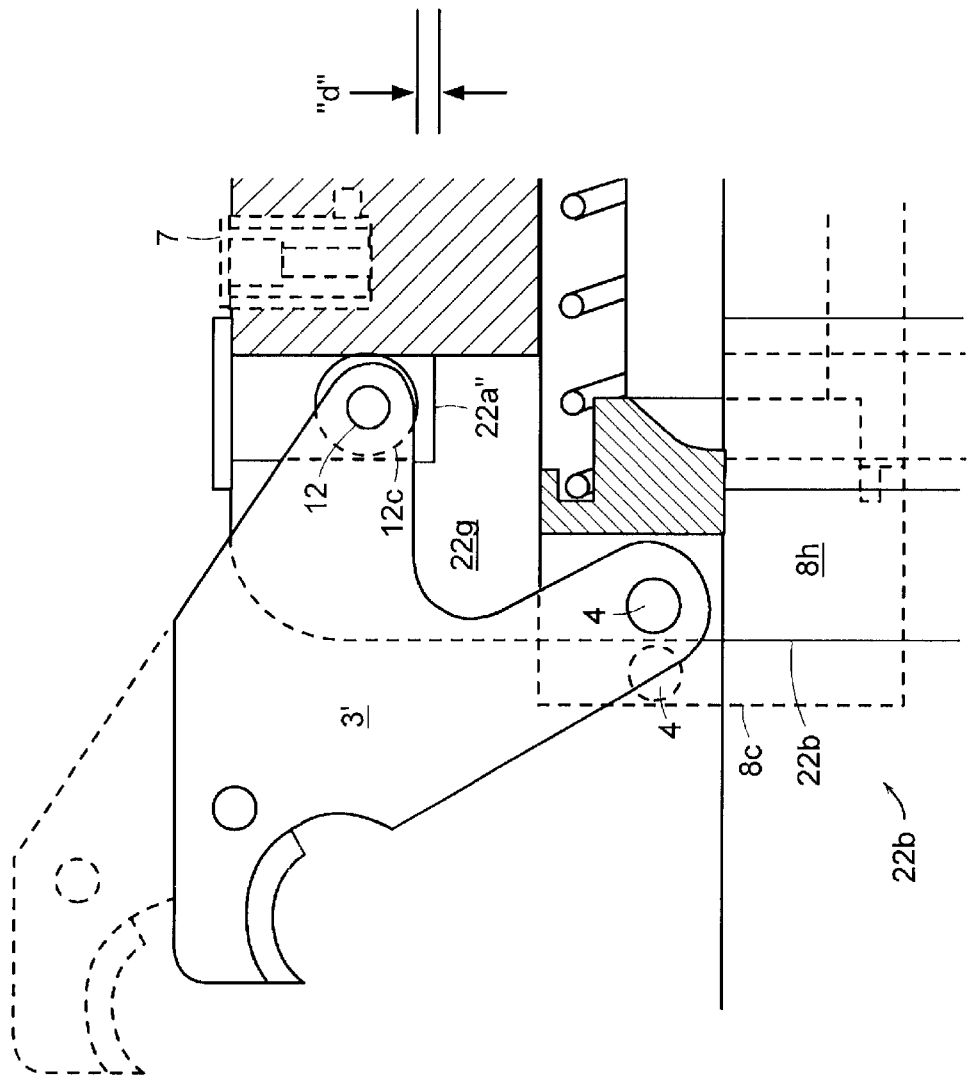
FIG. 7 is a view corresponding to FIG. 4 and shows the gripping element arrangement in a retracted position relative to the cylinder-part, and also shows in broken lines the gripping element arrangement in a slightly protruding position.

As will be evident from FIGS. 4 and 7, when a hexagonal spanner "N" is inserted into the valve 7 and the cylinder-part 22, and the gripping element arrangements 3 and the shaft 8 are rotated through several turns, the shaft 4 will be moved slightly outside the front surface 22b of the cylinder-part 22, therewith enabling the shaft to be easily removed (displaced) for replacement of one gripping element arrangement 3 with another gripping element arrangement 30, or vice versa. The hexagonal spanner "N" is rotated in the reverse direction, upon completion of the exchange.

In FIGS. 3 and 4 (and in FIG. 7), the shaft or pin 4 is shown slightly inwardly of the front surface 22b of the cylinder-part 22, while it is shown in broken lines in FIG. 7 that rotation of the cylinder-part through from 2 to 5 turns, preferably 3–4 turns, causes the central-part 8 to "wander outwards" such that the shaft 4 (in the broken line illustration) will be located outside the surface 22b of the cylinder-part 22 to an extent such as to enable the shaft 4 to be moved axially through the hole 8e.

In order to achieve this movement of the gripping element 3', there is required a free space between the peripheral surface 12c of the roller bearing 12 and the bottom 22a" of the groove 22a. The extent of this free space has been referenced "d" in FIG. 7.

The arrangement of said shafts (the shaft 4) and their stop means will be described in more detail below with reference to FIG. 8.

Each of the gripping element arrangements is secured in the same way as the gripping element 3'.

The gripping element 3' is thus in pivotal co-action with the shaft 4. Provided on each side of the shaft 4 is a respective stop screw which have been designated 81 and 82 and also 83.

Figure 8:
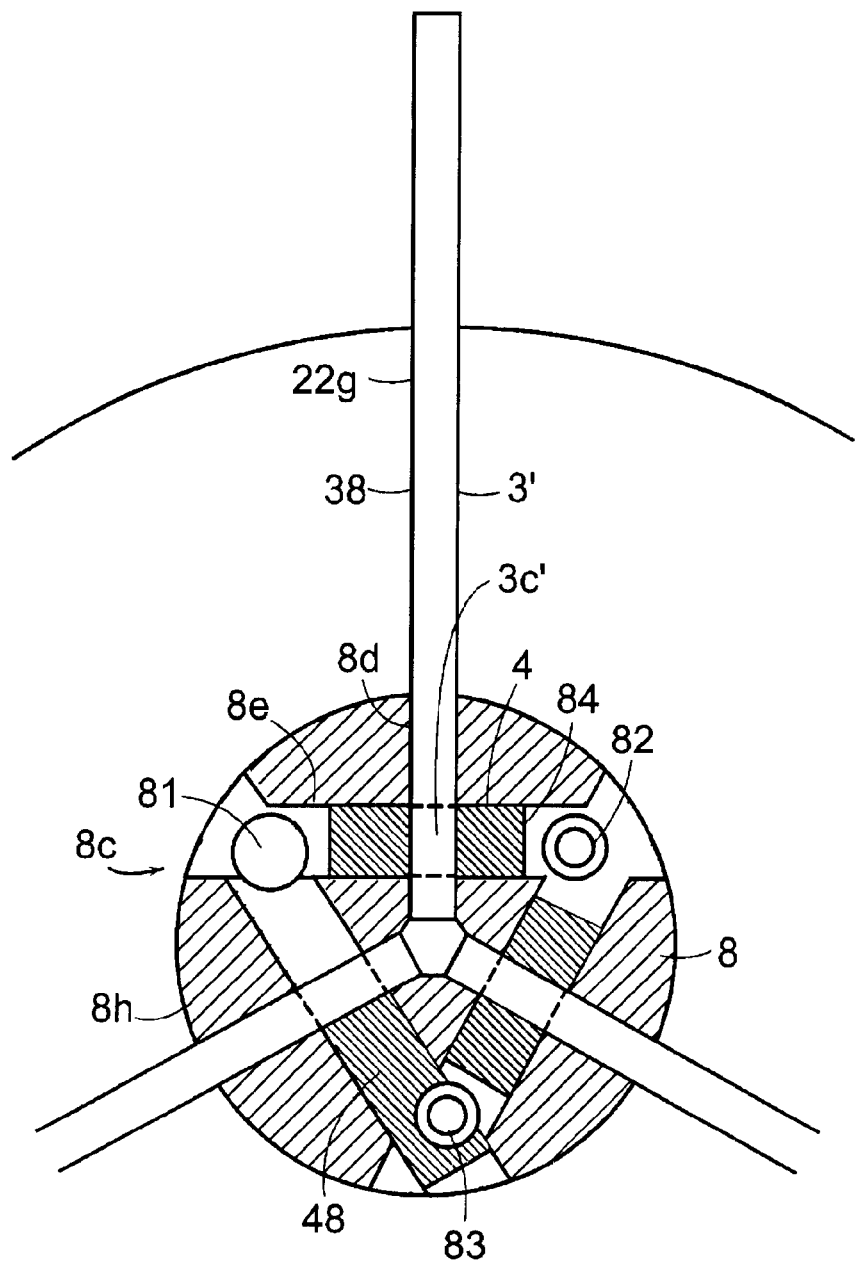
FIG. 8 is an end view of the central-part of said gripping arrangement and is intended to illustrate more clearly the orientation and fastening of requisite shafts in the gripping element arrangement for rotary movement and for facilitating the exchange or replacement of said gripping element arrangements.

These stop screws 81, 82 and 83 are screwed into the outer part of the collar 8h, said collar being omitted from FIG. 8.

When backing-off at least the screw 81, and, of course, also the screw 82, the shaft 4 can be moved to the left (or to the right) to an extent such as to bring the end-surface 84 adjacent to and slightly beyond the surface 38, therewith enabling the gripping element 3' to be removed and a new gripping element 30 fitted in its place. The shaft 4 is then moved back to the position shown in FIG. 8 and the stop screws 81, 82 tightened up.

The shaft 48 in FIG. 8 is shown in a such displaced position.

Rotation of the cylinder-part 22 shall be adapted so that the end-surfaces (84) of the shafts will be exposed to a certain extent sufficient to move the shafts axially, but not to an extent at which the shafts are free of the end-surface 22b. (In this respect, FIG. 7 shows a slightly excessive displacement of the front surface 8c of the central-part 8 in relation to the surface 22b of the cylinder-part 22, since the cylinder-part 22 shall be capable of functioning as a means of stopping axial movement of the shaft 4 to a position which exceeds a predetermined limit position, wherewith only a part of the ends of the shaft need be exposed in front of the surface 22b of the cylinder-part 22.)

It will be understood that the invention is not restricted to the aforedescribed and illustrated exemplifying embodiments thereof, and that modifications can be made within the scope of the inventive concept as defined in the following Claims.

What is claimed is:

1. An apparatus for gripping and releasing a piece of material comprising, in combination:
    a piston-cylinder assembly comprising
        a cylinder having a circular groove opening onto an outer peripheral surface of the cylinder;
        a piston disposed within the cylinder; and
    a plurality of gripping elements, each movable between a closed position and an open position in response to movement of the piston-cylinder assembly and having a rolling support surface engageable with the circular groove of the cylinder.

2. The apparatus according to claim 1, further comprising a central body part extending through the cylinder and secured to the piston.

3. The apparatus according to claim 2, further comprising a plurality of pivot shafts, wherein one end of the central body part includes slots adapted to cooperate with corresponding gripping elements and holes, each pivot shaft received in a corresponding hole for pivotally mounting a corresponding gripping element within a corresponding slot of the central body part.

4. The apparatus according to claim 3, wherein the one end of the central body part includes three radially extending slots.

5. The apparatus according to claim 2, wherein each gripping element includes a first end part and a second end part, one of the end parts having a material gripping surface and the other of the end parts being removably connected to the central body part by way of a pivot shaft.

6. The apparatus according to claim 2, wherein the central body part extends through the piston, a front portion of the central body part including means for rotatable co-action with one end of respective gripping elements, rear regions of the gripping elements having roller bearings adapted to roll along radially extending surfaces of the circular groove during movement of the gripping elements.

7. The apparatus according to claim 2, wherein the central body part comprises a cylinder-like part having a front part with a collar that includes radial grooves that receive the gripping elements and co-act with one end of respective gripping elements, and a rear part that tapers and is fixed to the piston.

8. The apparatus according to claim 7, wherein each radial groove opens into the circular groove.

9. The apparatus according to claim 2, wherein a rear region of each gripping element is adapted to act against the circular groove within a radial area extending between 25% and 75% of a radial distance extending from a center line of the central body part to the outer peripheral surface of the cylinder.

10. The apparatus according to claim 2, further comprising a collar on a front part of the central body part and a spring disposed midway of the central body part, the spring acting between the collar and the cylinder.

11. The apparatus according to claim 10, wherein a rear region of each gripping element includes a hole, and a shaft received in the hole and supporting roller bearings adapted to roll along radially extending surfaces of the circular groove.

12. The apparatus according to claim 2, wherein the cylinder includes an outer peripheral collar surrounding the piston and fixed relative to the central body part.

13. The apparatus according to claim 1, wherein the piston is secured to the central body part.

14. The apparatus according to claim 1, wherein the cylinder is reciprocatingly moveable with respect to the piston.

15. The apparatus according to claim 1, wherein the piston-cylinder assembly further comprises a spring and a space between the cylinder and the piston, the cylinder being movable with respect to the piston in a first direction upon introduction of pressure into the space and movable in an opposite second direction from a force of the spring.

16. The apparatus according to claim 1, wherein the gripping elements are configured to be in their closed position when the cylinder is fully extended relative to the piston and in their open position the cylinder is in a retracted position relative to the piston.

17. The apparatus according to claim 1, further comprising a plurality of gripping members, each gripping member removably coupled to a corresponding gripping element.

18. The apparatus according to claim 17, wherein an outer part of each gripping element has an arcuate surface with which an arcuate surface of the gripping member can be coupled.

19. The apparatus according to claim 18, wherein the arcuate surface of each gripping element forms part of a circle with an angle of arc greater than 90°.

20. The apparatus according to claim 18, wherein the arcuate surface of each gripping element has an angle of arc of between 90° and 170°.

21. The apparatus according to claim 17, further comprising a locking arrangement for releasably securing each gripping member to a corresponding gripping element.

22. The apparatus according to claim 21, wherein each locking arrangement is spaced from a gripping edge of the corresponding gripping member.

23. The apparatus according to claim 21, wherein a gripping edge of each gripping element is adapted to grip plastic.

24. The apparatus according to claim 21, wherein a gripping edge of each gripping element is adapted to grip steel.

25. The apparatus according to claim 1, further comprising a plurality of pivot shafts, each gripping element rotatable about a corresponding pivot shaft, and a plurality of stop screws, a stop screw being positioned on each side of each pivot shaft to lock the each pivot shaft in position.

26. The apparatus according to claim 25, wherein each stop screw is threaded into a collar of a central body part of the piston-cylinder assembly.

27. The apparatus according to claim 25, wherein an end surface of each pivot shaft can be at least partially exposed by loosening the stop screws and rotating a central body part of the piston-cylinder assembly relative to the cylinder a predetermined number of turns.

28. The apparatus according to claim 27, wherein the cylinder is configured to prevent displacement of the pivot shaft completely out of the central body part.

29. An apparatus for gripping and releasing a piece of material comprising, in combination:
   a piston-cylinder assembly comprising
      a cylinder having a circular groove opening onto an outer peripheral surface of the cylinder;
      a piston disposed within the cylinder, the cylinder being reciprocatingly moveable with respect to the piston; and
      a central body part extending through the cylinder and the piston;
   a plurality of pivot shafts; and
   a plurality of gripping elements, each gripping element comprising
      a first end part and a second end part, one of the end parts having a material gripping surface and the other of the end parts being removably connected to the central body part by way of a pivot shaft;
      a rolling support surface engageable with the circular groove of the cylinder; and
      movable between a closed position and an open position in response to movement of the piston-cylinder assembly, the gripping element being in a closed position when the cylinder is fully extended relative to the piston and in an open position when the cylinder is in a retracted position relative to the piston;
   wherein the central body part comprises a cylinder-like part having a front part with a collar that includes radial grooves that receive the gripping elements, holes, a rear part that tapers and is fixed to the piston, and roller bearings that roll along radially extending surfaces of the circular groove during movement of the gripping elements, each pivot shaft being received in a corresponding hole for pivotally mounting a corresponding gripping element to the central body part.

30. The apparatus according to claim 29, wherein a rear region of each gripping element is adapted to act against the circular groove within a radial area extending between 25% and 75% of a radial distance extending from a center line of the central body part to the outer peripheral surface of the cylinder.

31. The apparatus according to claim 29, further comprising a collar on the front part of the central body part and a spring unit disposed midway of the central body part, the spring acting between the collar and the cylinder.

32. The apparatus according to claim 29 wherein each radial groove opens into the circular groove.

33. The apparatus according to claim 29, wherein a rear region of each gripping element includes a hole, and a shaft received in the hole and supporting roller bearings adapted to roll along radially extending surfaces of the circular groove.

34. The apparatus according to claim 29, wherein the front part of the central body part includes three radially extending slots.

35. The apparatus according to claim 29, further comprising a plurality of gripping members, each gripping member removably coupled to a corresponding gripping element.

36. The apparatus according to claim 35, wherein an outer part of each gripping element has an arcuate surface with which an arcuate surface of the gripping member can be coupled.

37. The apparatus according to claim 36, wherein the arcuate surface of each gripping element forms part of a circle with an angle of arc greater than 90°.

38. The apparatus according to claim 36, wherein the arcuate surface of each gripping element has an angle of arc of between 90° and 170°.

39. The apparatus according to claim 35, further comprising a locking arrangement for releasably securing each gripping member to a corresponding gripping element.

40. The apparatus according to claim 39, wherein each locking arrangement is spaced from a gripping edge of the corresponding gripping member.

41. The apparatus according to claim 35, wherein a gripping edge of each gripping member is adapted to grip plastic.

42. The apparatus according to claim 35, wherein a gripping edge of each gripping member is adapted to grip steel.

43. The apparatus according to claim 29, further comprising a plurality of stop screws, a stop screw being positioned on each side of each pivot shaft to lock the each pivot shaft in position.

44. The apparatus according to claim 43, wherein each stop screw is threaded into the collar of the central body part.

45. The apparatus according to claim 43, wherein an end surface of each pivot shaft can be at least partially exposed by loosening the stop screws and rotating the central body part relative to the cylinder a predetermined number of turns.

46. The apparatus according to claim 45, wherein the cylinder is configured to prevent displacement of the pivot shaft completely out of the central body part.

* * * * *